3,324,201
BACTERIOSTATIC AGENTS FOR THERMOPLASTIC
POLYMER COMPOSITIONS
Donald L. Peiser and Ralph R. Langner, Lake Jackson, Tex., assignors to The Dow Chemical Company, Midland, Mich., a corporation of Delaware
No Drawing. Filed Aug. 2, 1963, Ser. No. 299,457
6 Claims. (Cl. 260—895)

This invention concerns new bacteriostatic polymer compositions and pertains to a method of making the same.

It is known to prepare bacteriostatic plastics by incorporating a bacteriostatic agent with certain thermoplastic polymers, e.g. polyethylene, polypropylene or polystyrene copolymerized with acrylonitrile. Other polymers such as polystyrene, polyvinyl chloride and other non-porous polymers do not release the bactericide.

It has now been discovered that bacteriostatic polymer compositions that are self-sterilizing can readily be prepared by intimately incorporating with a thermoplastic resinous polymer such as polystyrene or polystyrene modified with natural or a synthetic rubber, a styrene-acrylate copolymer, or a vinyl chloride polymer, such as polyvinyl chloride, or copolymers of vinyl chloride and up to 10 percent by weight of a vinyl ester such as vinyl acetate, vinyl propionate etc., a small but effective proportion of a complex of a bacteriostatic agent as hereinafter specified and a complexing agent selected from the group consisting of poly(vinylmorpholinones), poly(vinyl-oxazoldinones) and poly(vinylpyrrolidones).

The bacteriostatic agent can be 2,2'-thiobis(4,6-dichlorophenol), 2,2'-methylene bis(3,4,6-trichlorophenol), 3,4',5-tribromosalicylanilide, 4',4-dibromosalicylanilide, or dodecylchlorodiphenyl ether sulfonic acid, alkali salt, or mixtures of any two or more of said agents, or other similar biocides, and is complexed with a material such as poly(vinylmorpholinone) poly (N-vinyl-5-methyl-2-oxazolidinone) or poly(vinylpyrrolidone).

The complexes are prepared by stirring and/or heating a mixture of the bacteriostatic agent and the complexing agent preferably dissolved in an inert volatile organic solvent, in proportions corresponding to from about 25 to 75 parts by weight of the bacteriostatic agent and from 75 to 25 parts of the complexing agent, preferably in proportions of approximately equal parts by weight, and thereafter separating the solvent from the complex.

The complex of the bacteriostatic agent and the complexing agent can be used in amounts corresponding to from 0.5 to 5 percent by weight of the thermoplastic polymer used, and can be intimately incorporated with the polymer in any usual way such as by compounding the ingredients with one another on rolls, a Banbury mixer or a plastics extruder to intimately and uniformly incorporate the materials into a homogeneous or substantially homogeneous composition.

The compositions of the invention are useful for a variety of purposes such as the molding of boxes, cups, containers, film, sheet, rods, bars, tape and the like by usual compression and injection molding operations or by extrusion methods.

The following examples illustrate ways in which the principle of the invention has been applied but are not to be construed as limiting its scope.

*Example 1*

(A) A charge of 50 grams of poly(vinylmorpholinone) dissolved in 100 grams of methylene chloride and 50 grams of hexachlorophene dissolved in 50 grams of methylene chloride were placed in a glass reaction vessel equipped with a reflux condenser and stirrer. The mixture was stirred for one hour at room temperature, then was maintained under reduced pressure to vaporize and remove most of the methylene chloride. The residue was heated at a temperature of 60° C. at 40 mm. of Hg absolute pressure for a period of 20 hours. The product was a complex of the hexachlorophene and the poly(vinylmorpholinone).

(B) A charge of 25 grams of granular molding grade polystyrene, having a viscosity characteristic corresponding to 18 centipoise as determined for a 10 weight percent solution of the polystyrene in toluene at 25° C., and 0.5 gram of the complexed hexachlorophene product prepared in part A above, was mixed together and blended for 10 minutes on a pair of laboratory compounding rolls heated at 160° C. Thereafter, the product was removed from the rolls and was cooled to room temperature and crushed to a granular form. Portions of the product were compression molded to form a flat sheet 0.02 inch thick. Test pieces of ½ x ½ inch square were cut from the sheet. These test pieces were used to determine a bacteria inhibition value for the blended product. The procedure for determining the bacteria inhibition value was to place a one-half inch square test piece of the film of the product on a nutrient agar jelly which had been smeared with *Aerobacter aerogenes* bacteria and observe the culture after 24 hours. There was a zone of bacteria growth inhibition around the test piece of the film.

In contrast, when the polystyrene was blended with hexachlorophene alone and tested as described above there was no zone of bactericidal inhibition.

Blending portions of the polystyrene with 4 percent by weight of poly(vinylmorpholinone), poly(N-vinyl-5-methyl-2-oxazolidinone) or poly(vinylpyrrolidone) respectively, and testing the composition as described above showed no zone of inhibition against growth of *Aerobacter aerogenes*.

*Example 2*

A complex of 50 parts by weight of dodecylchlorodiphenyl ether sulfonic acid, sodium salt, and 50 parts of poly(N-vinyl-5-methyl-2-oxazolidinone) was prepared by procedure similar to that employed in part A of Example 1. A bactericidal polystyrene composition was prepared by blending 4 parts by weight of the complexed sulfonated dodecyl chlorodiphenyl ether with 100 parts by weight of polystyrene, employing procedure similar to that employed in part B of Example 1. A portion of the composition was compression molded and tested for bacteria inhibition employing procedure as described in Example 1. The composition inhibited growth of the *Aerobacter aerogenes* bacteria.

In contrast, when the polystyrene was blended with 2 parts by weight of non-complexed dodecyl chlorodiphenyl ether sulfonic acid, sodium salt and tested in a similar manner, no zone of inhibition was present.

*Example 3*

A complex of 50 parts by weight of brominated salicylanilide consisting of a mixture of approximately 50 percent by weight of 3,4',5-tribromosalicylanilide and 50 percent of 4',5-dibromosalicylanilide, and 50 parts by weight of poly(vinylmorpholinone) was prepared by procedure similar to that employed in part A of Example 1. A composition was prepared by blending 2 parts by weight of the complex with 100 parts by weight of polystyrene by procedure similar to that employed in part B of Example 1. The composition was found to have a bacteria inhibition zone 10 mm. wide around a test piece of film prepared from the composition and tested by procedures employed in Example 1.

Example 4

A complex of 50 parts by weight of dodecylchlorodiphenyl ether sulfonic acid, sodium salt, and 50 parts by weight of poly(vinylmorpholinone), was prepared by procedure similar to that employed in part A of Example 1. A composition was prepared by blending 2 parts by weight of the complex with 100 parts of polystyrene employing procedure similar to that employed in part B of Example 1. The composition was found to have a bacteria inhibition zone 8 mm. wide around a test piece of film prepared from the composition and tested by procedures employed in Example 1.

Example 5

Similar results were obtained when a complex of the dodecylchlorodiphenyl ether sulfonic acid, sodium salt, and poly(vinylpyrrolidone) were used in place of the complex with poly(vinylmorpholinone).

Example 6

Similar results were obtained when a rubber reinforced styrene polymer was employed in place of the polystyrene used in the example.

Example 7

A composition was prepared by blending 2 parts by weight of the complex of hexachlorophene and poly(vinylmorpholinone) prepared in part A of Example 1 with 100 parts by weight of polyvinyl chloride on compounding rolls at a temperature of 160° C. The composition was found to have a bacteria inhibition zone 5 mm. wide around a test piece of film prepared from the composition when tested by procedures similar to those employed in Example 1.

Example 8

Similar results are obtained when a complex of dodecylchlorodiphenyl ether sulfonic acid, sodium salt, or a complex of 3,4′,5-tribromosalicylanilide or 4′,5-dibromosalicylanilide or a mixture of such bromosalicylanilides and poly(vinylpyrrolidone) or poly(N-vinyl-5-methyl-2-oxazolidinone are used in place of the complex of hexachlorophene and poly(vinylmorpholinone).

We claim:

1. A bacteriostatic plastic material consisting essentially of a thermoplastic polymer selected from the group consisting of styrene polymers and polyvinyl chloride, having intimately incorporated therewith from 0.5 to 5 percent by weight of a complex of a bacteriocidal compound selected from the group consisting of hexachlorophene, 3,4′,5-tribromosalicylanilide, 4′,5-dibromosalicylanilide and dodecylchlorodiphenyl ether sulfonic acid, alkali salt, with a polymeric complexing material selected from the group consisting of poly(vinyloxazolidinones), poly(vinylmorpholinones) and poly(vinyl pyrrolidones).

2. A composition as claimed in claim 1 wherein the thermoplastic polymer is polystyrene.

3. A composition as claimed in claim 1 wherein the thermoplastic polymer is polyvinyl chloride.

4. A bacteriostatic plastic material consisting essentially of a thermoplastic styrene polymer having intimately incorporated therewith from 0.5 to 5 percent by weight of a bactericidal substance consisting of approximately equal parts by weight of hexachlorophene and poly(vinyloxazolidinone) complexed with one another.

5. A bacteriostatic plastic material consisting essentially of a thermoplastic styrene polymer having intimately incorporated therewith from 0.5 to 5 percent by weight of a bactericidal substance consisting of approximately equal parts by weight of hexachlorophene and poly(vinylmorpholinone) complexed with one another.

6. A bacteriostatic plastic material consisting essentially of polyvinyl chloride having intimately incorporated therewith from 0.5 to 5 percent by weight of a bactericidal substance consisting of approximately equal parts by weight of hexachlorophene and poly(vinylmorpholinone) complexed with one another.

References Cited

UNITED STATES PATENTS 2,919,200  12/1959  Dubin et al. _____ 167—42
3,027,347  3/1962   Fikentscher et al. ____ 260—895

MURRAY TILLMAN, Primary Examiner.

J. L. WHITE, Assistant Examiner.